(12) United States Patent
Scheideler et al.

(10) Patent No.: US 11,086,909 B2
(45) Date of Patent: Aug. 10, 2021

(54) PARTITIONING KNOWLEDGE GRAPH

(71) Applicant: International Business Machines Corporation, Armonk, NY (US)

(72) Inventors: Tim Uwe Scheideler, Schoenenberg (CH); Erik Rueger, Ockenheim (DE); Stefan Ravizza, Wallisellen (CH); Frederik Frank Flöther, Schlieren (CH)

(73) Assignee: International Business Machines Corporation, Armonk, NY (US)

(*) Notice: Subject to any disclaimer, the term of this patent is extended or adjusted under 35 U.S.C. 154(b) by 374 days.

(21) Appl. No.: 16/200,757

(22) Filed: Nov. 27, 2018

(65) Prior Publication Data

US 2020/0167426 A1    May 28, 2020

(51) Int. Cl.
*G06F 16/28* (2019.01)
*G06F 16/242* (2019.01)

(52) U.S. Cl.
CPC ........ *G06F 16/285* (2019.01); *G06F 16/2425* (2019.01)

(58) Field of Classification Search
CPC .............. G06F 16/2425; G06F 16/285; G06F 16/9024; G06F 16/906
See application file for complete search history.

(56) References Cited

U.S. PATENT DOCUMENTS

| 2017/0091342 A1* | 3/2017 | Sun ..................... G06F 16/2379 |
| 2018/0052884 A1* | 2/2018 | Kale ........................ G06N 5/04 |
| 2018/0075359 A1* | 3/2018 | Brennan ............. G06F 16/9024 |
| 2018/0082183 A1* | 3/2018 | Hertz ....................... G06F 16/36 |
| 2018/0144424 A1* | 5/2018 | Sahu ....................... G16H 40/63 |
| 2018/0165352 A1* | 6/2018 | Huang ................ G06F 16/2379 |
| 2018/0165552 A1 | 6/2018 | Huang et al. |

FOREIGN PATENT DOCUMENTS

| CN | 107071084 A | 8/2017 |
| CN | 108399180 A | 8/2018 |

OTHER PUBLICATIONS

Written Opinion and International Search Report, dated Mar. 5, 2020, International Application No. PCT/IB2019/060059, 9 pages.
(Continued)

*Primary Examiner* — Baoquoc N To
(74) *Attorney, Agent, or Firm* — Timothy J. Singleton (57) ABSTRACT

A method for partitioning a knowledge graph is provided. The method analyzes past searches and determines an access frequency of a plurality of edges. The method marks, as intermediate cluster cores, edges having the highest access frequencies, sorts the marked intermediate cluster cores according to their access frequencies, and selects a first cluster core having the highest access frequency. The method assigns first edges in a first radius around the first cluster core to build the first cluster. The method selects a second cluster core having the highest access frequency apart from edges of the first cluster, and assigns second edges in a second radius around second cluster core to build the second cluster. The method partitions the knowledge graph into a first sub-knowledge-graph comprising the first cluster and a second sub-knowledge-graph comprising the second cluster.

21 Claims, 8 Drawing Sheets

(56) References Cited

OTHER PUBLICATIONS

Jinnai et al., "A Graph-Partitioning Based Approach for Parallel Best-First Search", Published 2017, Center for Advanced Intelligence Project, The University of Tokyo, http://caps17.icaps-conference.org/workshops/HSDIP/proceedings/jinnai-fukunaga-icaps2017wshsdip.pdf, 9 pages.

Song et al., "Parallel Graph Summarization for Knowledge Search", Washington State University, Published 2017, 8 pages, http://www.mlgworkshop.org/2017/paper/MLG2017_paper_16.pdf.

Fionda et al., "Explaining and Querying Knowledge Graphs by Relatedness", Proceedings of the VLDB Endowment, vol. 10, No. 12, Copyright 2017 VLDB Endowment, 4 pages, http://www.vldb.org/pvldb/vol10/p1913-fionda.pdf.

Liu et al., "Reducing Million-Node Graphs to a Few Structural Patterns: A Unified Approach", University of Michigan, Published 2016, DOI: 10.1145/1235, 8 pages, www.mlgworkshop.org/2016/paper/MLG2016_paper_29.pdf.

Koutra, "Making Sense of Large Graphs: Summarization and Similarity", Carnegie Mellon University, Computer Science Department, Mlconf 2014, Atlanta, GA, 37 pages.

"Centrality", Wikipedia, the free encyclopedia, last edited on Sep. 30, 2018, printed Oct. 4, 2018, https://en.wikipedia.org/wiki/Centrality, 14 pages.

Acar et al., "Data Structures and Algorithms for Robust and Fast Parallel Graph Search", Carnegie Mellon University & Inria, 2014, 13 pages. gallium.inria.fr/~rainey/parallel-graph-search.pdf.

Weinstock et al., "Parallel A* Graph Search", School of Computer Science, Carnegie Mellon University, 9 pages, 2008, people.csail.mit.edu/rholladay/docs/parallel_search_report.pdf.

Sarkar, "Parallel Graph Algorithms", Chapter 10, Department of Computer Science, Rice University, COMP 422, Lecture 24, Apr. 10, 2008, 43 pages.

Buluc et al., "Parallel Graph Algorithms", Lawrence Berkeley National Laboratory, Apr. 2012, Lecture, 101 pages.

\* cited by examiner

PARTITIONING KNOWLEDGE GRAPH

BACKGROUND

The present disclosure relates generally to a method for partitioning a knowledge graph, and more specifically, to a computer-implemented method for partitioning a knowledge graph comprising a plurality of nodes and edges. The present disclosure relates further to a related system for partitioning a knowledge graph, and a computer program product.

In cognitive computing, knowledge graphs are used to store and process information. A knowledge graph consists of facts (collected from various sources) which are stored on the vertices or nodes of a mesh and edges, also known as links storing the relationship between the fact, the nodes, the vertices. The edges may have related attributes describing the nature and/or intensity of the relationship.

The first and foremost operation performed on knowledge graphs in terms of computing operations are the search operations. The concept of parallelizing graph searches has been widely studied by researches. The traditional parallelization approach for searching in a knowledge graph is based on splitting off search processes when a certain condition is met (e.g., a sufficient number of edges originate at the current point of the search path). When running concurrent threads, crossing/merging of search paths must be controlled and the parallelization overhead must not outweigh the performance gain.

However, this approach to parallelization a search request does not take results from previous searches into account. Each search is performed independently using a static algorithm. The algorithm does not consider the specific structure of the knowledge graph on which the search is performed.

Instead of defining rules for splitting the processes into sub-processes running on the entirety of the knowledge graph, an alternative approach is desired in order to increase performance and accuracy.

There are several disclosures related to a computer-implemented method for partitioning a knowledge graph.

Document US 2018/0052884 A1 discloses a processing of natural language user inputs into a more formal, machine-readable, structured query representation used for making an item recommendation. Analyses of user inputs are coordinated via a knowledge graph constructed from categories, attributes, and attribute values describing relatively frequently occurring prior interactions of various users with an electronic marketplace. The knowledge graph has directed edges each with a score value based on the conditional probabilities of categories/attributes/attribute value interaction calculated from user behavioral patterns, associations between user queries and structured data based on historical buyer behavior patterns in the marketplace, metadata from items made available for purchase by sellers used to better define buyers' requirements, and/or world knowledge of weather, locations/places, occasions, and item received that map to inventory-related data, for generating relevant prompts for further user input.

Document US 2018/0144424 A1 describes methods and systems for querying multiple healthcare-related knowledge graphs. The method includes receiving a set of health care-related responds sub-graphs from a plurality of health-care-related knowledge graphs based on the keyword-based query. Sub-graphs are ranked and new sub-graphs are generated.

A disadvantage of known solutions may be in the fact that the proposed methods are more or less static, domain-specific and/or lacking parallelism for such activities.

SUMMARY

According to one aspect of the present disclosure, a computer-implemented method for partitioning a knowledge graph may be provided. The knowledge graph may comprise a plurality of nodes and a plurality of edges, wherein the edges may link selected ones of the nodes. The method may comprise analyzing a set of past searches and based thereon determining an access frequency of each of the plurality of edges in the knowledge graph and marking as intermediate cluster cores a predefined percentage of edges having the highest access frequencies in the knowledge graph.

The method may further comprise sorting the marked intermediate cluster cores—i.e., respective the edges—according to their access frequencies, selecting as first cluster core of the intermediate cluster core, having the highest access frequency, and assigning first edges in a pre-defined first radius around the first cluster core, wherein the first cluster core and the first edges build the first cluster.

Additionally, the method may comprise selecting as second cluster core of the intermediate cluster cores, having the highest access frequency apart from edges of the first cluster, and assigning second edges in a pre-defined second radius around second cluster core, wherein the second cluster core and the second edges build the second cluster, and partitioning the knowledge graph into a first sub-knowledge-graph comprising the first cluster and a second sub-knowledge-graph comprising the second cluster.

According to another aspect of the present disclosure, a system for partitioning a knowledge graph may be provided. The knowledge graph may comprise a plurality of nodes and a plurality of edges, wherein the edges may link selected ones of the nodes. The system may comprise an analysis unit adapted for analyzing a set of past searches and based thereon determining an access frequency of each of the plurality of edges in the knowledge graph, a marking unit adapted for marking as intermediate cluster cores a pre-defined percentage of edges having the highest access frequencies in the knowledge graph, and a sorting module sorting the marked intermediate cluster cores according to their access frequencies.

Additionally, the system may comprise a selection unit adapted for selecting as first cluster core of the intermediate cluster core, having the highest access frequency, and assigning first edges in a pre-defined first radius around the first cluster core, wherein the first cluster core and the first edges build the first cluster. The selection unit may also be adapted for selecting as second cluster core of the intermediate cluster cores, having the highest access frequency apart from edges of the first cluster, and assigning second edges in a pre-defined second radius around second cluster core. The second cluster core and the second edges may build the second cluster.

Furthermore, the system may comprise a partitioning module adapted for partitioning the knowledge graph into a first sub-knowledge-graph comprising the first cluster and a second sub-knowledge-graph comprising the second cluster.

The proposed computer-implemented method for partitioning a knowledge graph may offer multiple advantages and technical effects:

By separating (logically) a large and complex knowledge graph into sub-knowledge-graphs or subgraphs such processes may be executed faster, resulting in a shorter response time to user queries. Instead of starting several search-processes in the same large knowledge graph—as done by known technologies—local search engines may be forked from a global search engine having received a search request. The local search engines may primarily be executed using only one of the logically separated subgraphs. This may reduce the requirement for managing interactions between the different search processes on one single knowledge graph. Additionally, it may also be possible to search for different topics in the different subgraphs. Furthermore, if a search path reaches the border of a subgraph, i.e., a cluster, the search process of the local search engine may be handed over to a parallel local search engine, operable on the other subgraphs. This may reduce the effort for maintaining a conflict handling mechanism when parallel search engines operate on the single large knowledge graph.

After partitioning the knowledge graph, the individual subgraphs can be more easily be put into a consistent state (i.e., all queued operations are committed); after this, the entire knowledge graph may be set into a consistent state for, e.g., an easier archiving. This may allow a more efficient approach for backup and archiving one subgraph instead of the complete knowledge graph. Also, a higher performance can be achieved for update (i.e., write) operations, which may require also a queue-commit cycle, when performed on subgraphs independently instead of performing them on the entire knowledge graph.

In the following, additional embodiments of the inventive concept will be described.

According to an embodiment, the method comprises selecting additional intermediate cluster cores in an iteratively way, having each the highest access frequency apart from edges of the already built clusters (e.g., previously selected clusters), and assigning respective edges in a respective pre-defined radius around each of additional intermediate cluster cores, wherein each of the additional intermediate cluster cores and the respective edges build a further cluster. Hence, the proposed concept may easily be extendable to split or partition the original entire knowledge graph into a plurality of sub-knowledge-graphs or knowledge sub-graphs.

According to one possible embodiment of the method, the first radius, the second radius and the respective radius may each be a predefined path length around the respective cluster core. In this version a more or less radial and symmetrical protected area may be created for other cluster cores.

According to one embodiment of the method, the first radius, the second radius and the respective radius may each be the predefined path length value of a sum of inverted values of the access frequencies of the edges. Such an approach may block more edges from becoming another cluster core in areas more frequently traversed by searches. This way, the cluster may be formed along the frequent search paths instead of being circular, and thus, increase a performance for later search request.

According to an embodiment, the method may also comprise maintaining for each edge—in addition to other attributes and attribute values of each edge—an access counter value which may be incremented each time a search path runs through the edge. Another attribute for each average may be a maintained score value representing the access frequency of a search path running through the respective edge. A split of the counter and the score may seem to be superfluous; however, this may have a significant advantage because more emphasis could be given on the most recent searches.

According to one further advantageous embodiment, the method may also comprise updating the score value on a time-wise regular basis based on the access counter value, and resetting the access counter value to zero. This method may apply a score which puts more weight on the most recent search paths traversals through the edge and less weight on earlier search path traversals. As an example, the new score may be calculated as the current score divided by two and the current counter divided by two. In this way, the current count contributes with 50%, the count of the previous period contributes with 25%, the count of the pre-previous period contributes with 12.5%, etc. Thus, a dynamically adaptive reaction to such requests in the knowledge graph may be implemented straightforward.

According to one useful embodiment of the method, the partitioning the knowledge graph may also comprise determining a shortest path between two adjacent cluster cores (e.g., cluster cores of two adjacent clusters), wherein the shortest path is the path having the lowest sum of access frequencies of the respective edges along the respective path, marking the edge having the lowest access frequency on the determined shortest path as cut-point—which may be handed as additional attribute of an edge—between the adjacent clusters (e.g., two adjacent clusters corresponding to the two adjacent cluster cores), and repeating the step of determining a shortest path and the step of marking the edge as cut-point until no path exists between the adjacent cluster that is free of edges comprising the cut-point mark. Thus, two subgraphs may be separated from each other in a comparably simple way. It also represents a dynamic way of separating subgraphs because the actual access frequency of past searches may be reflected instead of using a static approach to partition a knowledge graph.

According to one subsequent advantageous embodiment, the method may also comprise, upon receiving a new search request—i.e., after the partitioning—to the knowledge graph, assigning a local search engine to each of the sub-knowledge-graphs, passing the new search request to each of the local search engines assigned to the sub-knowledge-graphs, and performing the new search request in parallel in the sub-knowledge-graphs by the local search engines. The use algorithm may be free to choose any starting point for the search in the respective sub-knowledge graphs. However, special rules may be applied to choose a most appropriate starting point for the searches in the subgraphs.

According to a further and subsequent advantageous embodiment, the method may also comprise starting the new search request in each of the respective sub-knowledge-graphs at a core linked to the respective cluster core. This may improve the performance of the search processes in the subgraphs and accordingly, the initially received search request, because the probability to have a quick hit in one of the nodes closest to the center of the subgraphs, i.e., the respective cluster center having had a high access frequency in the past, may be over proportionally high.

According to a further advantageous embodiment, the method may also comprise passing a search thread of a local search engine from the local search engine to another local search engine in another sub-knowledge-graph if the respective search path crosses a sub-knowledge-graph border. This way, the parallelism of search processes of the local search engines may continue even if a search path traverses a border between the partitioned subgraphs. This is possible because the related edges have not been really removed, but only marked as cut-points.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the present disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the examples of embodiments, but to which the present disclosure is not limited.

Some embodiments of the present disclosure will be described, by way of example only, and with reference to the following drawings.

DETAILED DESCRIPTION

In the context of this description, the following conventions, terms and/or expressions may be used:

The term 'knowledge graph' may denote a networked data structure comprising facts—represented in nodes—and edges—representing connections or links between the nodes. Thus, the knowledge graph may represent a knowledge base for an organization of so-called unstructured data, i.e., facts, and their semantic relationships. Knowledge graphs are often used by search engines. The edges may be characterized by related attributes, e.g., describing the strength of a link between two connected nodes. Other attributes may also be used, like access counters, etc. The edges and the nodes may be managed using unique identifiers (ID).

The term 'partitioning a knowledge graph' may denote an activity of separating an originally complete knowledge graph into at least two or more typically non-overlapping partial knowledge graphs. However, the separation is meant to be a logical separation or virtual separation in the sense that the respective edges are not removed completely from the originally complete knowledge graph. However, the respective edges of the cut get marked as comprising a cut-point as additional attribute of the average. Thus, the search algorithm may cross during its search process from node to node via the respective edges the logical boundaries or borders of the subgraphs. The result of a partitioning a knowledge graph may be denoted as sub-knowledge-graph or, shortly, subgraph.

Hence, a subgraph is a set of nodes separated (logically or virtually) from the entire or original knowledge graph. The subgraph comprises all edges connected to the nodes, also including the edges "logically removed" (i.e., comprising a-point) by the partitioning method mentioned above.

The term 'past searches' may denote information of search paths of the knowledge graph for a variety of different search requests in the past. The respective information may comprise information such as a starting point, i.e., start node of the search process, the edges accessed the final result and eventually also a processing time to execute the request and deliver a result.

The term 'access frequency'—in particular, an access frequency of an edge—may denote a number of times a search process has accessed a specific edge during a plurality of search processes in a knowledge graph. Thus, the access frequency may be used as a synonym for access count. Each time an edge is traversed by a search process, a related access counter is increased by 1. Hence, the attribute access frequency of an edge may actually be represented by an access counter value.

The term 'intermediate cluster cores' may denote a plurality of edges in a knowledge graph which may have been determined to show—after an analysis—the highest access frequencies of the respective edges. Because the access frequency of every edge in the knowledge graph is logged—e.g., as additional attribute to the edge—it may easily be determinable. All edges are those having the highest access frequency. A predefined percentage of the edges—e.g., the top 5% (other percentage numbers are possible) in the sorted list of edges according to the access frequency—may then be defined as the intermediate cluster cores. It may be useful to generate this way, a significantly higher number of intermediate cluster cores than the number of clusters into which the complete knowledge graph should be partitioned.

The term 'first cluster core' may denote the intermediate cluster core having the highest number of access frequencies of all intermediate cluster cores. If two edges show the same number of access frequencies, a random process may decide which of the two edges may be selected as the first cluster core.

The term 'second cluster core' may denote the edge having the second highest access frequency in the list of the intermediate cluster cores. However, this may only be the case if the edge having the second highest access frequency does not lie in the protection zone around the first cluster core, i.e., within the radius around the first cluster core. However, the second cluster core may be selected as the edge having the highest access frequency apart from the members of the first subgraph, i.e., the first cluster core and all nodes within the radius around the first cluster core.

The term 'radius' may denote a predefined or dynamically determined physical or logical radius around a cluster core.

The term 'access counter value' may denote an attribute of an edge which may be increased every time a search process may use the specific edge during an execution of a search request.

The term 'score value' may denote a measurement for an access counter value also reflecting time as an additional parameter. The score value may also be implemented as an additional attribute to an edge. The score value may represent a "front-loaded" access counter value in the sense that the more recent accesses to the edge may be given higher weight.

The term 'shortest path' may denote a combination of nodes and edges representing the shortest number of hops from a source node to a destination node. As part of the determination of the number of hops, also a weighing factor of the edges (and/or the nodes) may be reflected in the counting. The here used weighing factor may be the access frequency of an edge. Thus, the shortest path between a source node and a destination node may be defined as the sum of the access frequency of a long path.

The term 'cut-point' may denote an attribute of an edge marking logically that an edge or link from one node to the other has been cut or removed virtually. The cut-point basically marks the outer border of a subgraph.

The term 'new search request' may denote a search request after a partitioning of the knowledge graph into the subgraphs.

The term 'local search engine' may denote a process—in the computational sense—executing a search request in a subgraph. The subgraphs may be the result of the here disclosed partitioning process.

The term 'overlap zone' of a subgraph may denote the set of all nodes which can be reached on a path constituting at most a predefined number of k edges and which are not part of the subgraph themselves. A particular node may be within several overlap zones.

In the following, a detailed description of the figures will be given. All instructions in the figures are schematic. Firstly, a block diagram of an embodiment of the inventive computer-implemented method for partitioning a knowledge graph is given. Afterwards, further embodiments, as well as embodiments of the system for partitioning a knowledge graph, will be described.

Figure 1:
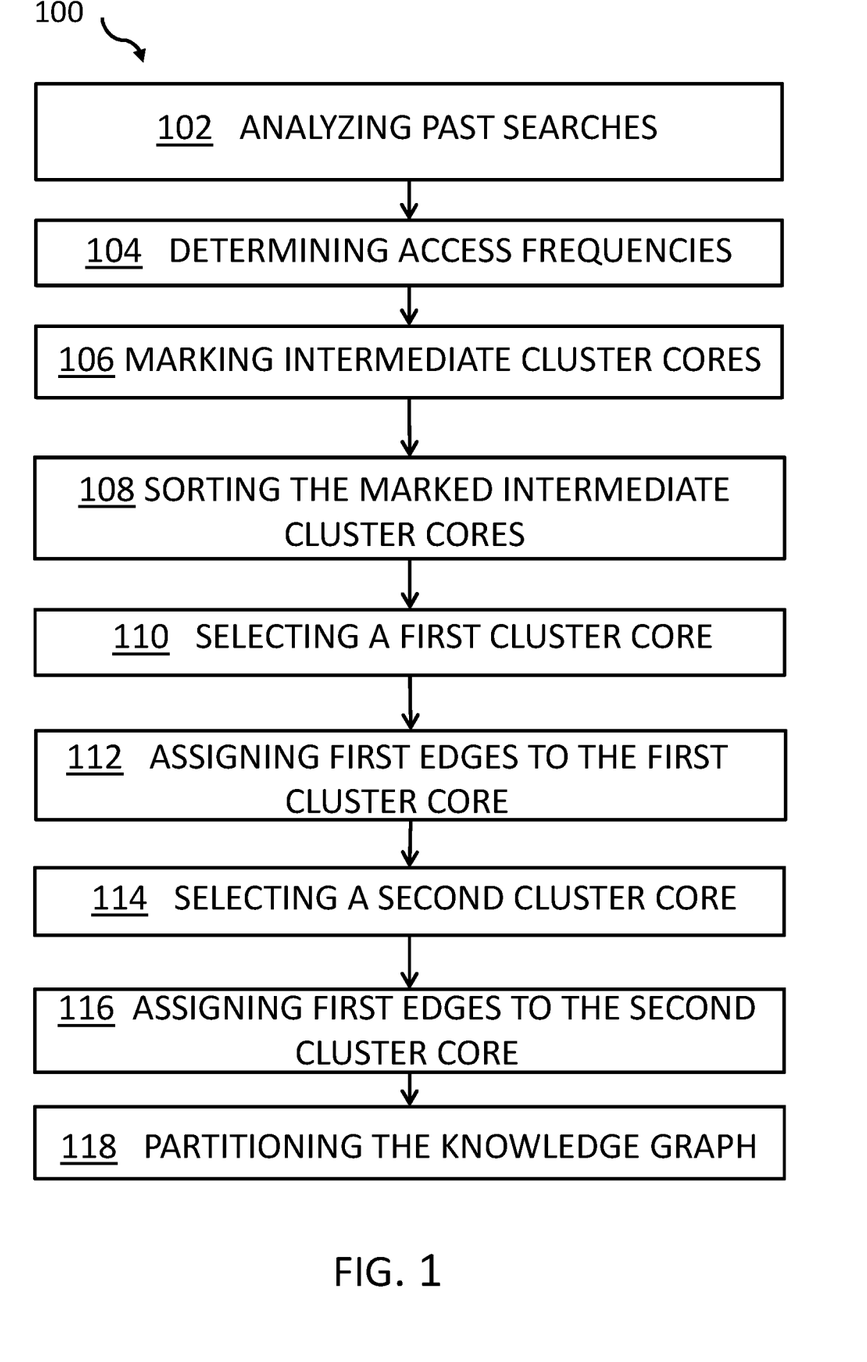
FIG. 1 shows a block diagram of an embodiment of the inventive computer-implemented method for partitioning a knowledge graph.

FIG. 1 shows a block diagram of an embodiment of the computer-implemented method 100 for partitioning a knowledge graph. The knowledge graph comprises a plurality of nodes and a plurality of edges, wherein the edges are linking selected ones of the nodes. The edges may have a plurality of attributes and the nodes may comprise facts.

The method 100 comprises analyzing, 102, a set of past searches and based thereon determining, 104, an access frequency of each of the plurality of edges in the knowledge graph. Searches in the knowledge graph may have started from different nodes; basically, the search paths are analyzed in respect to their access frequency, i.e., the access counter value, during the searches.

The method 100 marking, 106, as intermediate cluster cores a predefined percentage—e.g., 5%—of edges (not nodes) having the highest access frequencies in the knowledge graph, sorting, 108—in particular using a list—the marked intermediate cluster cores, i.e. the edges, according to their access frequencies, and selecting, 110, as first cluster core of the intermediate cluster core, having the highest access frequency, and assigning, 112, first edges in a pre-defined first radius around the first cluster core, wherein the first cluster core and the first edges build the first cluster. For the radius specification, different approaches may be used.

Furthermore, the method 100 comprises selecting, 114, as second cluster core of the intermediate cluster cores, having the highest access frequency apart from edges of the first cluster, and assigning, 116, second edges in a pre-defined second radius around the second cluster core, wherein the second cluster core and the second edges build the second cluster, and partitioning, 118, the knowledge graph into a first sub-knowledge-graph comprising the first cluster and a second sub-knowledge-graph comprising the second cluster.

Figure 2:
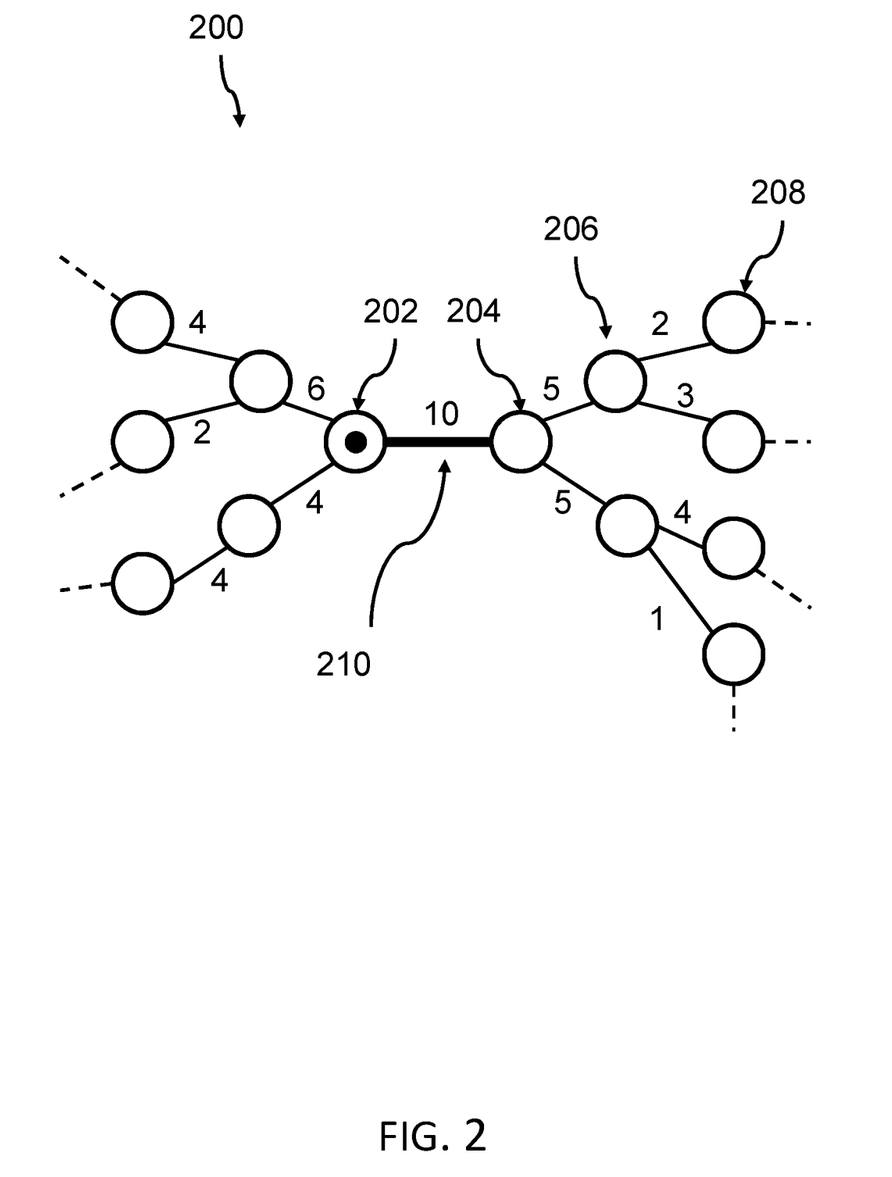
FIG. 2 shows a block diagram of an embodiment of a portion of the knowledge graph with a cluster core.

FIG. 2 shows a block diagram of an embodiment of a portion of a knowledge graph 200 with a cluster core. In particular, an exemplary distribution of search path frequencies over a set of edges from past searches is shown. The nodes of vertices are shown as circular elements, some of which have a reference numeral (e.g., 202, 204, 206, 208). The figure serves as an example for the two scenarios: Firstly, a search starts from the node 202 marked with the dot. Secondly, a search starts outside the set of nodes shown in the figure and the search paths traverse the nodes shown in the figure. The dotted lines indicate edges to other vertices not shown in the figure.

The links, i.e., edges between the nodes are shown as straight lines. The numbers beside the edges show exemplary search path frequencies of the edges. This parameter will be managed by the knowledge graph management system as a separate attribute of the edges. Hence, the access frequency between node 202 and node 204 has been 10 at edge 210; as another example, the access frequency between node 202 and node 206 has been 5, and the access frequency between the nodes 206 and 208 has been 2. The dotted lines at the peripheral nodes shown in FIG. 2 indicate that the knowledge graph extends even further. However, it is also visible that the edge between the nodes 202 and 204 is the one having the highest access frequency, namely 10. Thus, this edge can be seen as the cluster core of the shown nodes, if these nodes are assumed to be a cluster.

The general approach to identify a cluster core is performed in the following way: The system stores the unique identification number (ID) of the predefined amount (e.g., 5%, other values possible) of edges which are most frequented by search paths in a list. The list is sorted top-down by access frequency in a search path.

The most frequented edge (i.e., primary edge) forms the center of the first subgraph. IDs of edges which are in a predefined radius of the primary edge are removed from the list or marked as not to be reflected further in the list. In one implementation, the radius is defined as a path length, i.e., a number of edges (disregarding any other attribute of edges). In another implementation, the radius is defined as the sum of the inverted values of the search frequency of each edge. The latter approach removes more edges in areas more frequently traversed or accessed by searches. This way, the cluster is formed along the frequent search paths instead of being circular.

The radius relates to the total size of the knowledge graph. For example, for a knowledge graph with $10^6$ nodes partitioned into 10 subgraphs (i.e. approximately $10^5$ vertices per region), a radius of 100 would be reasonable. In case the radius is selected to be relatively large, centers of subgraphs on the fringe of the knowledge graph would be favored. A small radius results in identifying centers of subgraphs in the center of the entire knowledge graph.

After removing or blocking the ID of edges around the primary edge (within the radius), the edge on the top of the list is identified as the center of the second subgraph (i.e. secondary edge). Then the IDs of edges located in the pre-defined radius of the secondary edge are removed from the list or marked not to be used for the next cluster center. It may also be noted that from cluster to cluster center the radius may vary, e.g., be decreased. This would reflect that the higher order/lower dominant cluster centers are not traversed in searches as much as those cluster center/edges being identified before.

The process is iterated (e.g., performed two or more times with varying parameters or progressively excluding nodes or edges) until as many edges (i.e., cluster centers) as the pre-defined number of subgraphs have been identified. In some embodiments, once a number of edges or cluster centers equals a pre-defined number of subgraphs, the process may cease.

Figure 3:
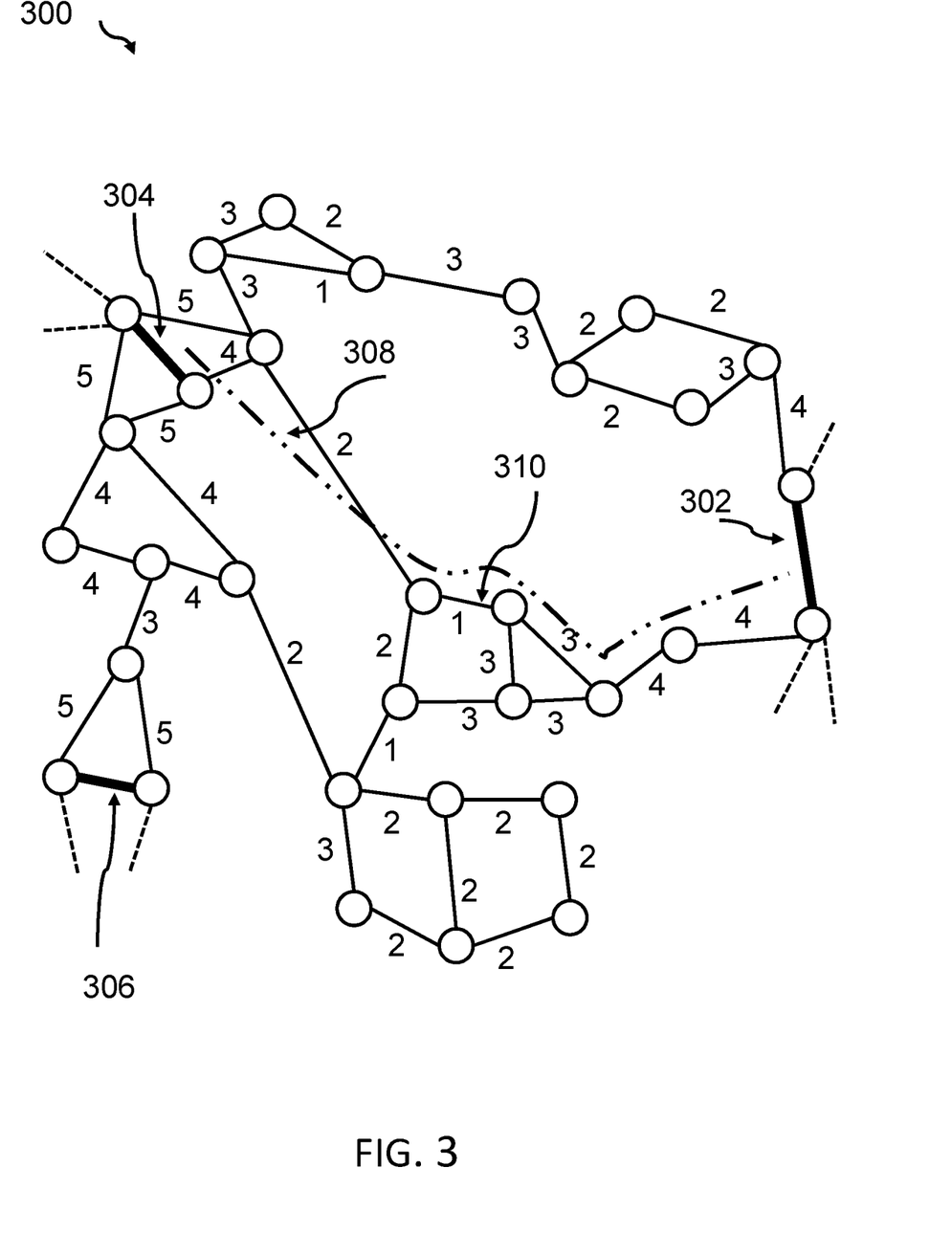
FIG. 3 shows a block diagram of an embodiment of a knowledge graph in a first step of partitioning subgraphs.

FIG. 3 shows a block diagram of an embodiment of a knowledge graph 300 in a first step of partitioning subgraphs.

The disclosed method of portioning a knowledge graph iterates two steps: 1.) Determine the shortest path between two centers where the path length is defined as the sum of the search frequencies of each edge. 2.) Remove, in this path, the edge with the lowest search frequency.

The method starts by separating the entire knowledge graph 300 in two parts, the portion comprising a primary edge 302 from a secondary edge 304. The two steps above are iterated until there remains not any path connecting the primary edge 302 with the secondary edge 304.

The method then separates the portion of the knowledge graph 300 comprising the primary edge 302 from the portion comprising the tertiary edge 306 and from all other edges identified as centers of subgraphs. The primary edge 302, secondary edge 304, and tertiary edge 306 (e.g., edges 302, 304, 306) of the respective cluster center are marked in FIG. 3 as bold lines between the respective nodes, for identification purposes.

The method then separates the secondary edge 304 from the tertiary edge 306, and so on, until the entire knowledge graph 300 is partitioned in the complete set of subgraphs (i.e., the number of predefined subgraphs to be determined).

The following example illustrates the method in more detailed steps. The search path numbers of accesses (i.e., how many times the search process used this edge) in FIG. 3 are illustrative and do not necessarily add up to form a search path traversing all the vertices shown like in the previous figure.

In this example, three edges 302, 304, 306 have been identified as cluster centers (e.g., cluster centers 302, 304, 306) of subgraphs have been identified, as explained above, using the list and sorting approach. The shortest path 308 between the primary and secondary subgraph has a length of 18, i.e., sum of access frequencies of edges. The edge 310 with the lowest search frequency, namely 1, is cut-marked at first.

Figure 4:
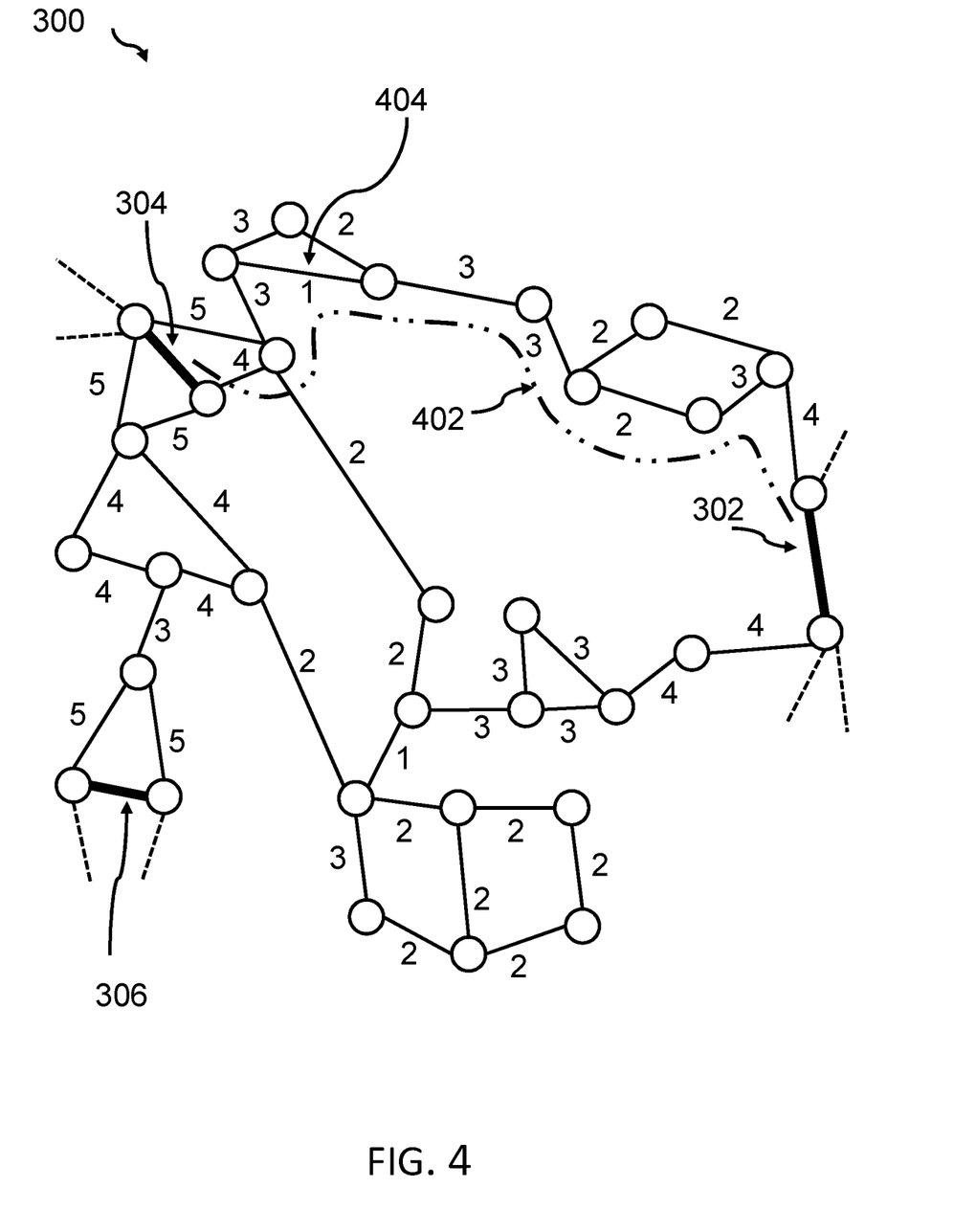
FIG. 4 shows a block diagram of an embodiment of a knowledge graph in a second step of partitioning subgraphs.

FIG. 4 shows a block diagram of an embodiment of a knowledge graph 300 in a second step of partitioning subgraphs. After a removal of the first edge (FIG. 3, 310), the shortest path 402 has now the length 20. The edge 404 with the access frequency 1 is cut-marked next.

Figure 5:
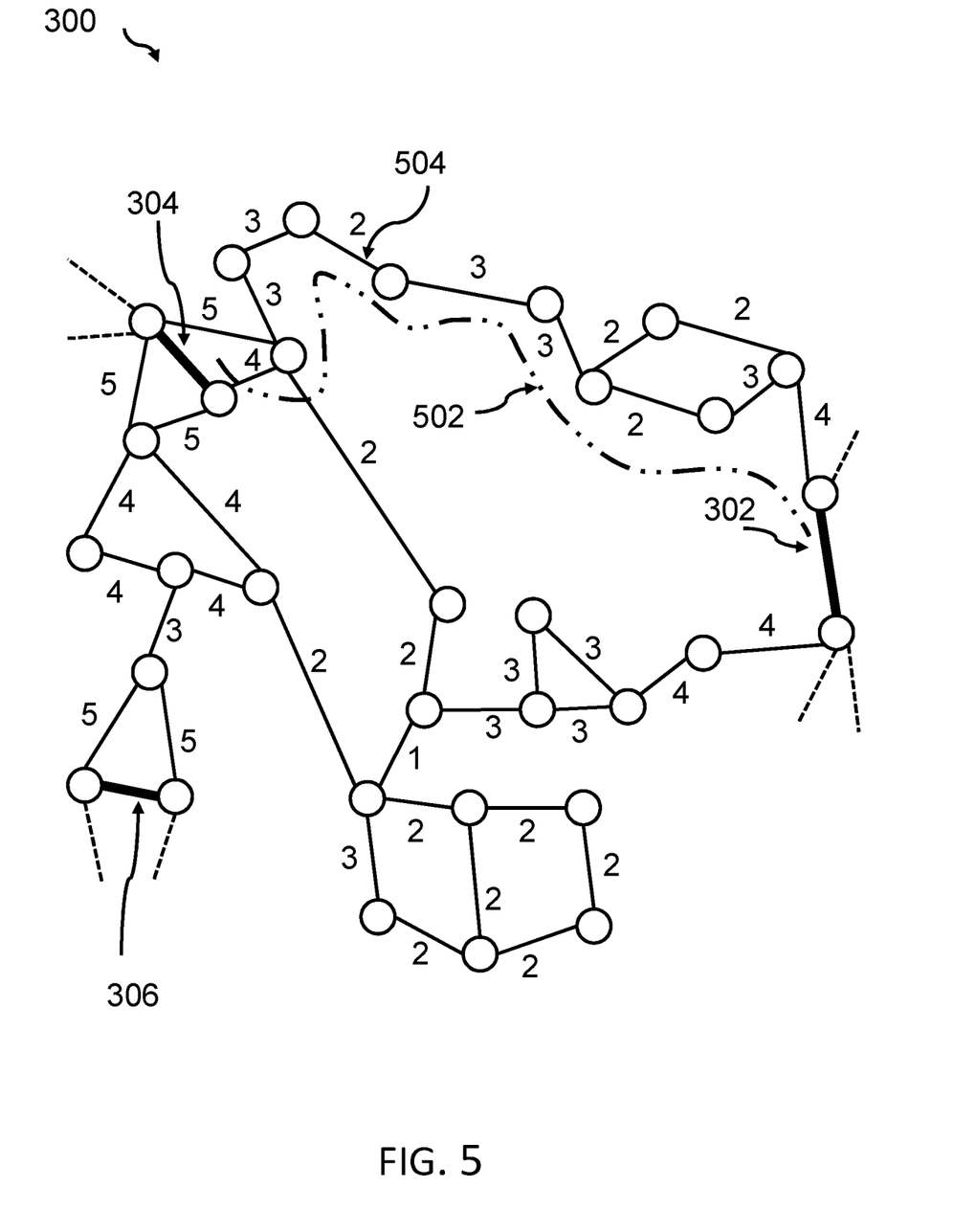
FIG. 5 shows a block diagram of an embodiment of a knowledge graph in a third step of partitioning subgraphs.

FIG. 5 shows a block diagram of an embodiment of a knowledge graph 300 in a third step of partitioning subgraphs. In this case, the shortest path between the cluster centers 302 and 304 extends along the dotted line 502. Along this path, the edge solely connecting the two cluster centers 302 and 304 is edge 504. This edge 504 gets the cut-mark next. Thus, the originally completed connected knowledge graph 300 has been cut-marked along the edges 310, 404 and 504.

Figure 6:
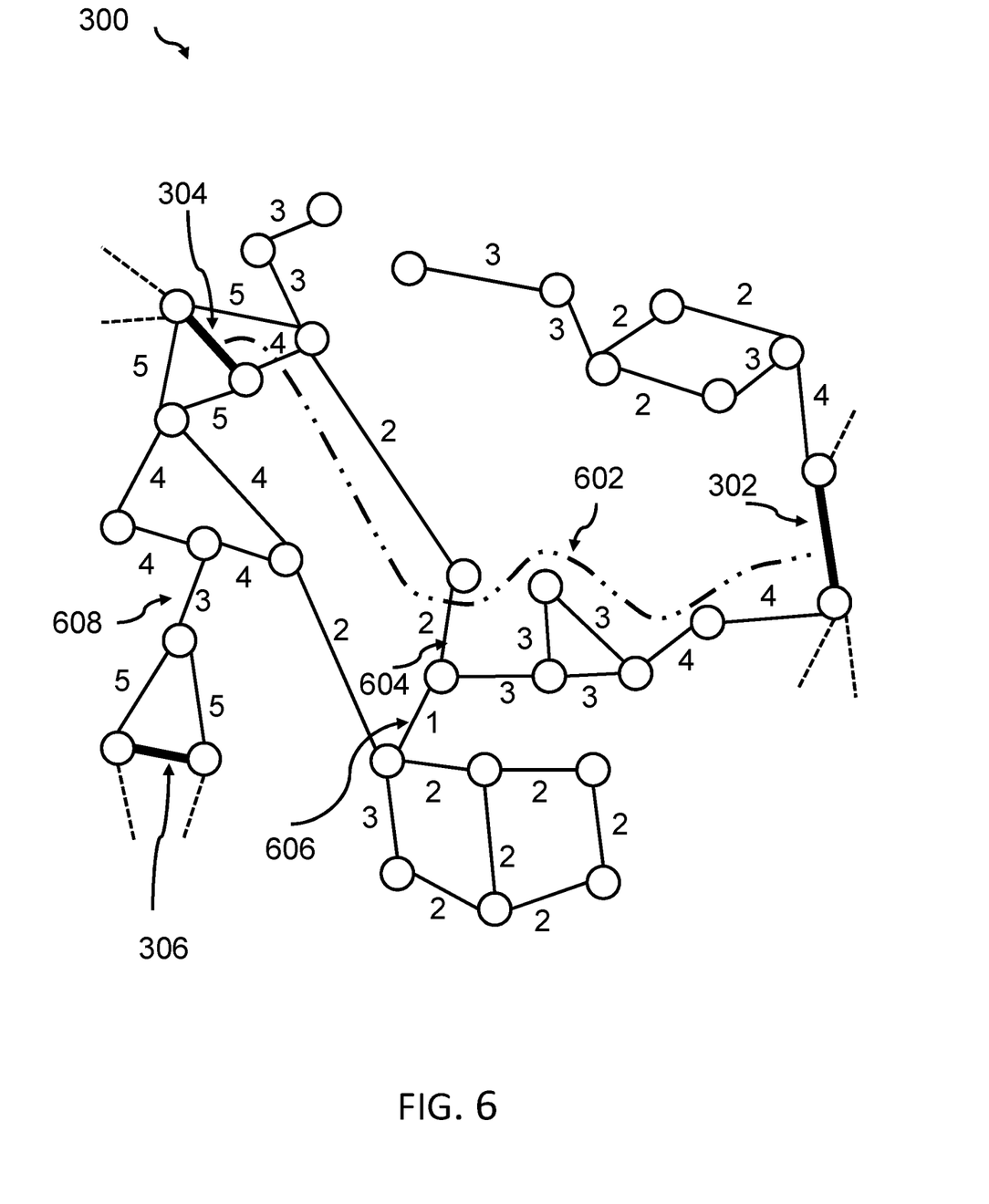
FIG. 6 shows a block diagram of an embodiment of a knowledge graph in a fourth and fifth step of partitioning subgraphs.

FIG. 6 shows a block diagram of an embodiment of a knowledge graph 300 in a fourth and fifth step of partitioning the subgraphs. This way, discussed in the context of FIG. 3 to FIG. 5, also the edges 604 and 606 are cut-marked. Accordingly, the shortest path in the fourth step between the cluster centers 302 and 304 traverses along the line 602. It may be noted that all cut-marked edges are not shown in the figures for comprehensibility reasons; one may say that they have been removed virtually. The edge 606 being cut-marked finally separates the sub cluster around the cluster center 302 from the remaining left portion of the originally complete knowledge graph 300.

In a final step for this exemplary partial knowledge graph 300, the edge 608 will be cut-marked (or virtually removed) in order to separate the subgraphs around the cluster center 304 from a subgraph with the cluster center 306.

As it has become understandable: The partitioning into subgraphs is to be understood as a logical construct or as a virtual cutting the edges between the subgraphs. Neither a copy is taken nor is data moved or removed, rather the nodes of a subgraph are labeled as members of the respective subgraph and receive an index numbering defined for the subgraph.

Before describing more hardware related aspects, some aspects of a search may be considered: In principle, depending on the structure of the knowledge graph and the search operation, the search can be started at one node or on several notes of the entire knowledge graph. In the latter case, the search is started on one node of each subgraph.

On a multi-core computer or multi-thread processor, the search processes are typically distributed across the cores or threads. This way, the entire knowledge graph is mapped on the underlying hardware. Per construction of the subgraphs, the processes stay mostly within the subgraphs.

In each subgraph, the local search process can be split into several parallel processes, i.e. by spawning and ending child processes.

However, if a search process is leaving a subgraph and entering into neighboring subgraphs, the method deals with the search processes in the following ways depending on the implementation:

a) The search process is terminated. This applies when search processes are constructed in such a way such that the entirety of a given range is covered.

b) The search process is handed over to another processing unit. The handing-over process may be treated by the receiving processing unit in the same way as any other child search process spawned by the original main search process running on that processing unit.

c) The current search process crossing a subgraph boundary is terminated and the search results are gathered. Additionally, the last position of the search process (i.e., current node and edge indicating the direction) is added to the list of starting points to the main search process of that subgraph and picked up if appropriate.

In one implementation, a crossing into another subgraph happens whenever a node is hit which is not part of the originating subgraph. In another implementation, an overlap zone is given, as defined above. Running in the overlap zone, the search process of a subgraph is allowed to enter into neighboring zones without being interrupted immediately (see implementation a) and c)) or handed over (as in implementation b)). In case the search process leaves the overlap zone by entering a neighboring subgraph, the search process is interrupted or handed over, as described above.

Figure 7:
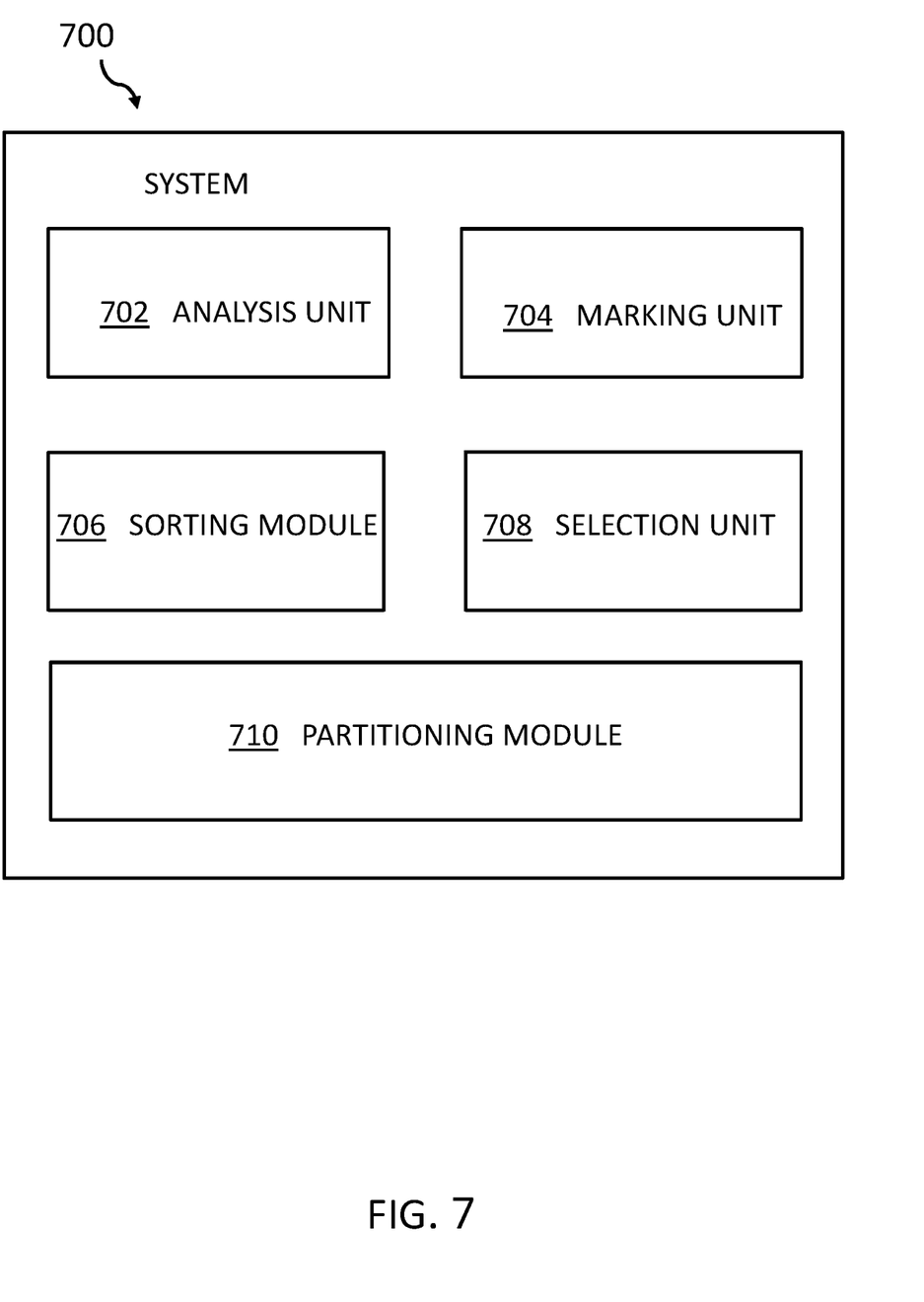
FIG. 7 shows a block diagram of an embodiment of the disclosed system for partitioning a knowledge graph.

FIG. 7 shows a block diagram of an embodiment of the disclosed system 700 for partitioning a knowledge graph.

The knowledge graph comprises a plurality of nodes and a plurality of edges, wherein the edges linking selected ones of the nodes. The system comprises an analysis unit 702 adapted for analyzing a set of past searches and based thereon determining an access frequency of each of the plurality of edges in the knowledge graph, a marking unit 704 adapted for marking as intermediate cluster cores a predefined percentage of edges having the highest access frequencies in the knowledge graph, and a sorting module 706 that is adapted for sorting the marked intermediate cluster cores according to their access frequencies.

A selection unit 708 is adapted for selecting, as a first cluster core of the intermediate cluster cores, an intermediate cluster core (e.g., a first intermediate cluster core or a first edge) having a highest access frequency. The selection unit 708 may also be configured or adapted for assigning first edges in a pre-defined first radius around the first cluster core. The first cluster core and the first edges may thereby build or form the first cluster. In some embodiments, the selection unit 708 is also adapted or configured for selecting as a second cluster core of the intermediate cluster cores, an intermediate cluster core (e.g., a second intermediate cluster core or a second edge) having a highest access frequency apart from edges of the first cluster. The selection unit 708 may assign second edges in a pre-defined second radius around the second cluster core. The second cluster core and the second edges may thereby build or form the second cluster.

The system 700 comprises a partitioning module 710 adapted for partitioning the knowledge graph into a first sub-knowledge-graph comprising the first cluster and a second sub-knowledge-graph comprising the second cluster.

Figure 8:
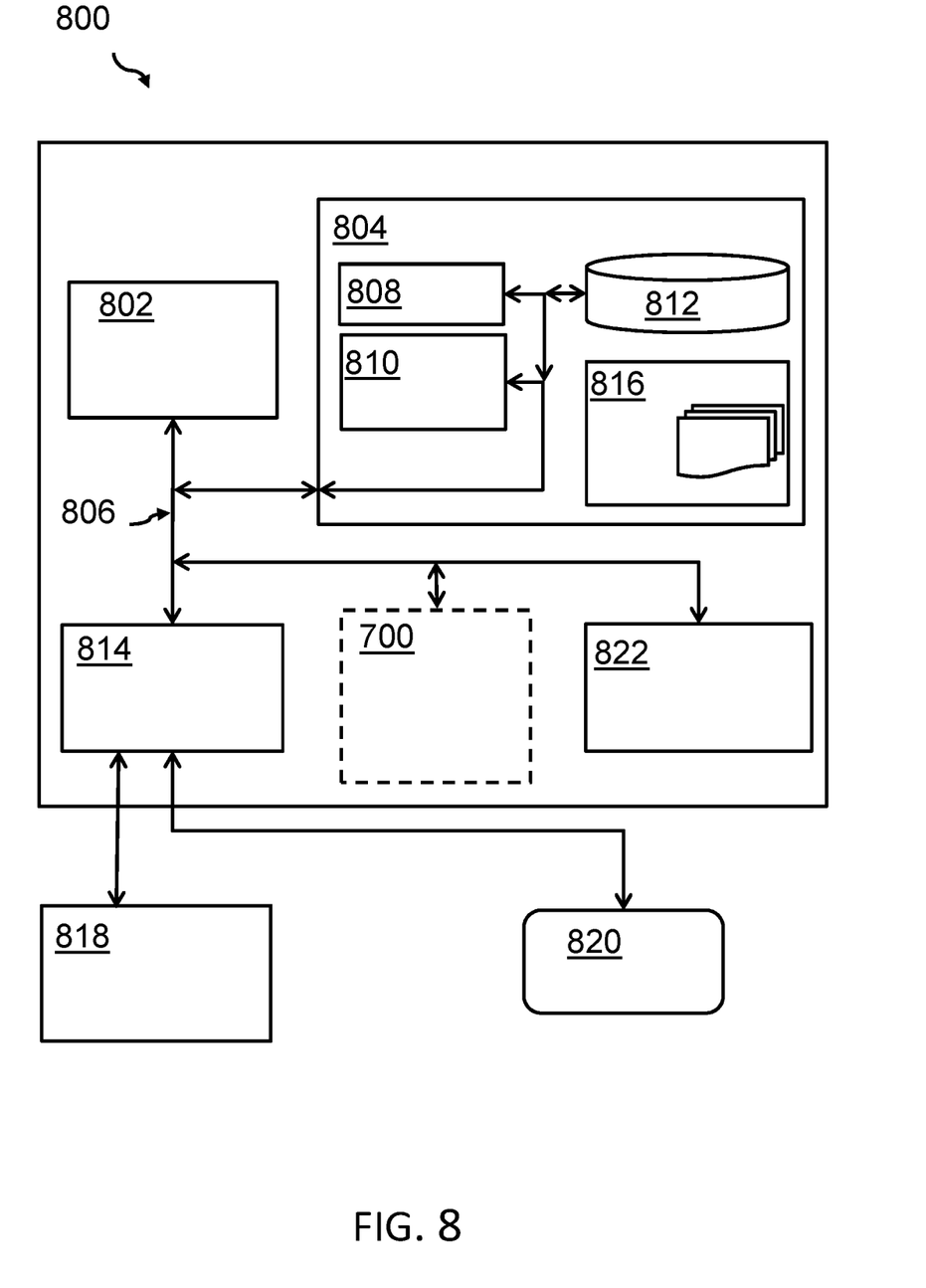
FIG. 8 shows a block diagram of an embodiment of a computing system comprising the system according to FIG. 7.

Embodiments of the present disclosure may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system, and is not intended to suggest any limitation as to the scope of use or functionality of embodiments of the present disclosure described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors 802 (e.g., processing units), a system memory 804 (e.g., a computer readable storage medium coupled to the one or more processors), and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, the system memory 804 may include at least one program product having a set (e.g., at least one) of program modules that are configured to carry out the functions of embodiments of the present disclosure.

The program/utility, having a set (at least one) of program modules 816, may be stored in the system memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the present disclosure, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the system 700 for partitioning a knowledge graph may be attached to the bus 806 (e.g., a plurality of buses forming a bus system).

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

What is claimed is:

1. A computer-implemented method comprising:
    analyzing, by one or more processors, a set of past searches and based thereon determining an access frequency of each of a plurality of edges in a knowledge graph having a plurality of nodes and the plurality of edges linking selected ones of the nodes;
    marking, by the one or more processors as intermediate cluster cores, a predefined percentage of edges having highest access frequencies of the plurality of edges within the knowledge graph;
    sorting, by the one or more processors, the marked intermediate cluster cores according to access frequencies of the predefined percentage of edges;
    selecting, by the one or more processors as a first cluster core, an intermediate cluster core having a highest access frequency, and assigning first edges in a pre-defined first radius around the first cluster core, wherein the first cluster core and the first edges build a first cluster;
    selecting, by the one or more processors as a second cluster core, an intermediate cluster core having a highest access frequency apart from edges of the first cluster, and assigning second edges in a pre-defined second radius around the second cluster core, wherein the second cluster core and the second edges build a second cluster; and
    partitioning, by the one or more processors, the knowledge graph into a first sub-knowledge-graph comprising the first cluster and a second sub-knowledge-graph comprising the second cluster.

2. The method of claim 1, further comprising:
    selecting one or more additional intermediate cluster cores in an iterative way, each additional intermediate cluster core having a highest access frequency apart from edges of previously selected clusters, and assigning respective edges in a respective pre-defined radius around each of the additional intermediate cluster cores, wherein each of the additional intermediate cluster cores and the respective edges build a further cluster.

3. The method of claim 2, wherein the pre-defined first radius, the pre-defined second radius, and the respective pre-defined radius are each a predefined path length around a respective cluster core of the one or more additional intermediate cluster cores.

4. The method of claim 2, wherein the pre-defined first radius, the pre-defined second radius, and the respective pre-defined radius are each a predefined path length value of a sum of inverted values of the access frequencies of the edges of the knowledge graph.

5. The method of claim 1, further comprising:
    maintaining for each edge an access counter value which is increased each time a search path runs through the edge; and
    maintaining a score value representing the access frequency of a search path running through the edge.

6. The method of claim 5, further comprising:
    updating the score value on a time-wise regular basis based on the access counter value; and
    resetting the access counter value to zero.

7. The method of claim 1, wherein partitioning the knowledge graph also comprises:
    determining a shortest path between two adjacent cluster cores of two adjacent clusters, wherein the shortest path is a path having a lowest sum of access frequencies of respective edges along a respective path;
    marking an edge having a lowest access frequency on the shortest path as a cut-point between the two adjacent clusters; and
    repeating the determining of a shortest path and the marking of the edge as the cut-point until no path exists between two adjacent clusters that is free of edges comprising a cut-point mark.

8. The method of claim 1, wherein, upon receiving a new search request to the knowledge graph, the method further comprising:

assigning a local search engine to each of the first and second sub-knowledge-graphs;
passing the new search request to each of the local search engines assigned to the first and second sub-knowledge-graphs; and
performing the new search request in parallel in the first and second sub-knowledge-graphs.

9. The method of claim 8, further comprising:
starting the new search request in each of the first and second sub-knowledge-graphs at a cluster core linked to one or more of the first and second cluster cores.

10. The method of claim 8, further comprising:
passing a search thread of a local search engine from a local search engine to another local search engine in another sub-knowledge-graph if a respective search path crosses a sub-knowledge-graph border.

11. A system, comprising:
one or more processors; and
a computer readable storage medium coupled to the one or more processors, the computer readable storage medium storing program instructions that, when executed by the one or more processors, cause the one or more processors to perform operations comprising:
analyzing a set of past searches and based thereon determining an access frequency of each of a plurality of edges in a knowledge graph having a plurality of nodes and the plurality of edges linking selected ones of the nodes;
marking, as intermediate cluster cores, a predefined percentage of edges having highest access frequencies within the knowledge graph;
sorting the marked intermediate cluster cores according to access frequencies of the predefined percentage of edges;
selecting, as a first cluster core, an intermediate cluster core having a highest access frequency, and assigning first edges in a pre-defined first radius around the first cluster core, wherein the first cluster core and the first edges build a first cluster;
selecting, as second cluster core, an intermediate cluster core, having a highest access frequency apart from edges of the first cluster, and assigning second edges in a pre-defined second radius around the second cluster core, wherein the second cluster core and the second edges build a second cluster; and
partitioning the knowledge graph into a first sub-knowledge-graph comprising the first cluster and a second sub-knowledge-graph comprising the second cluster.

12. The system of claim 11, wherein the operations further comprise:
selecting one or more additional intermediate cluster cores in a iterative way, each additional intermediate cluster core having a highest access frequency apart from edges of previously selected clusters, and assigning respective edges in a respective pre-defined radius around each of the additional intermediate cluster cores, wherein each of the additional intermediate cluster cores and the respective edges build a further cluster.

13. The system of claim 12, wherein the pre-defined first radius, the pre-defined second radius, and the respective pre-defined radius are each a predefined path length around a respective cluster core of the one or more additional intermediate cluster cores.

14. The system of claim 12, wherein the pre-defined first radius, the pre-defined second radius, and the respective pre-defined radius are each a predefined path length value of a sum of inverted values of the access frequencies of the edges of the knowledge graph.

15. The system of claim 11, wherein the operations further comprise:
maintaining for each edge an access counter value which is increased each time a search path runs through the edge; and
maintaining a score value representing the access frequency of a search path running through the edge.

16. The system of claim 15, wherein the operations further comprise:
updating the score value on a time-wise regular basis based on the access counter value; and
resetting the access counter value to zero.

17. The system of claim 16, wherein for the operations further comprise:
determining a shortest path between two adjacent cluster cores of two adjacent clusters, wherein the shortest path is a path having a lowest sum of access frequencies of respective edges along a respective path;
marking an edge having a lowest access frequency on the shortest path as a cut-point between the two adjacent clusters; and
repeating the determining of a shortest path and the marking of the edge as the cut-point until no path exists between two adjacent clusters that is free of edges comprising a cut-point mark.

18. The system of claim 11, wherein, upon receiving a new search request to the knowledge graph, the operations further comprise:
assigning a local search engine to each of the first and second sub-knowledge-graphs; and
passing the new search request to each of the local search engines assigned to the first and second sub-knowledge-graphs.

19. The system of claim 18, wherein for the operations further comprise:
performing the new search request in each of the first and second sub-knowledge-graphs at a cluster core linked to one or more of the first and second cluster cores.

20. The system of claim 18, wherein the operations further comprise:
passing a search thread of a local search engine from a local search engine to another local search engine in another sub-knowledge-graph if a respective search path crosses a sub-knowledge-graph border.

21. A computer program product comprising a computer readable storage medium having program instructions embodied therewith, the program instructions being executable by one or more processors to cause the one or more processors to perform operations comprising:
analyzing a set of past searches and based thereon determining an access frequency of each of a plurality of edges in a knowledge graph having a plurality of nodes and the plurality of edges linking selected ones of the nodes;
marking, as intermediate cluster cores, a predefined percentage of edges having highest access frequencies within the knowledge graph;
sorting the marked intermediate cluster cores according to access frequencies of the predefined percentage of edges;
selecting, as a first cluster core, an intermediate cluster core having a highest access frequency, and assigning first edges in a pre-defined first radius around the first cluster core, wherein the first cluster core and the first edges build a first cluster;

selecting, as second cluster core, an intermediate cluster core having a highest access frequency apart from edges of the first cluster, and assigning second edges in a pre-defined second radius around the second cluster core, wherein the second cluster core and the second edges build a second cluster; and partitioning the knowledge graph into a first sub-knowledge-graph comprising the first cluster and a second sub-knowledge-graph comprising the second cluster.

\* \* \* \* \*